Figure 16:
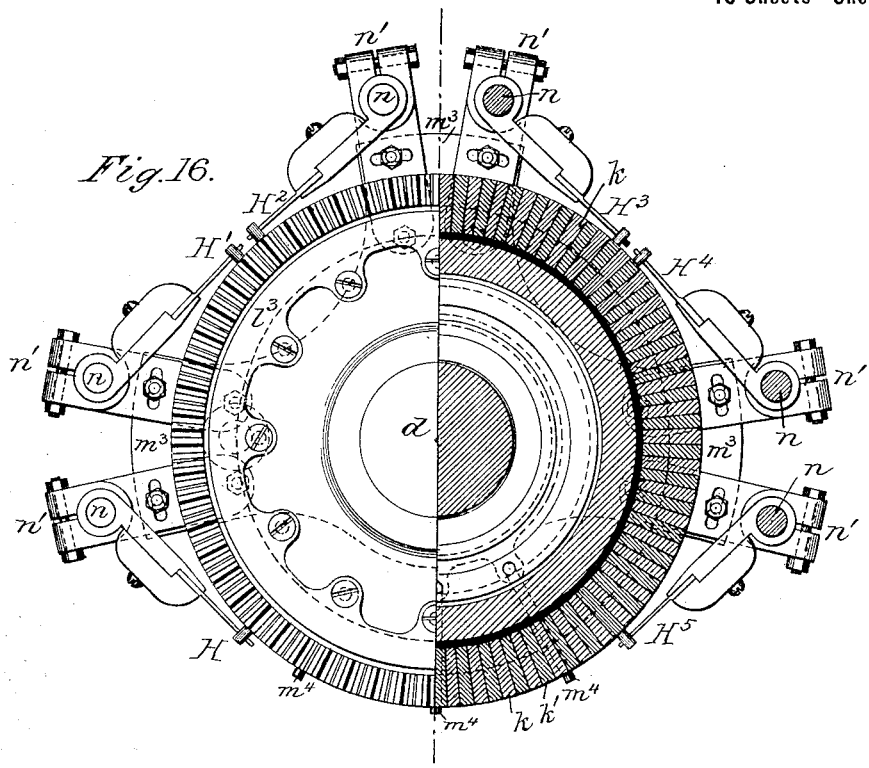

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.) 13 Sheets—Sheet 1.
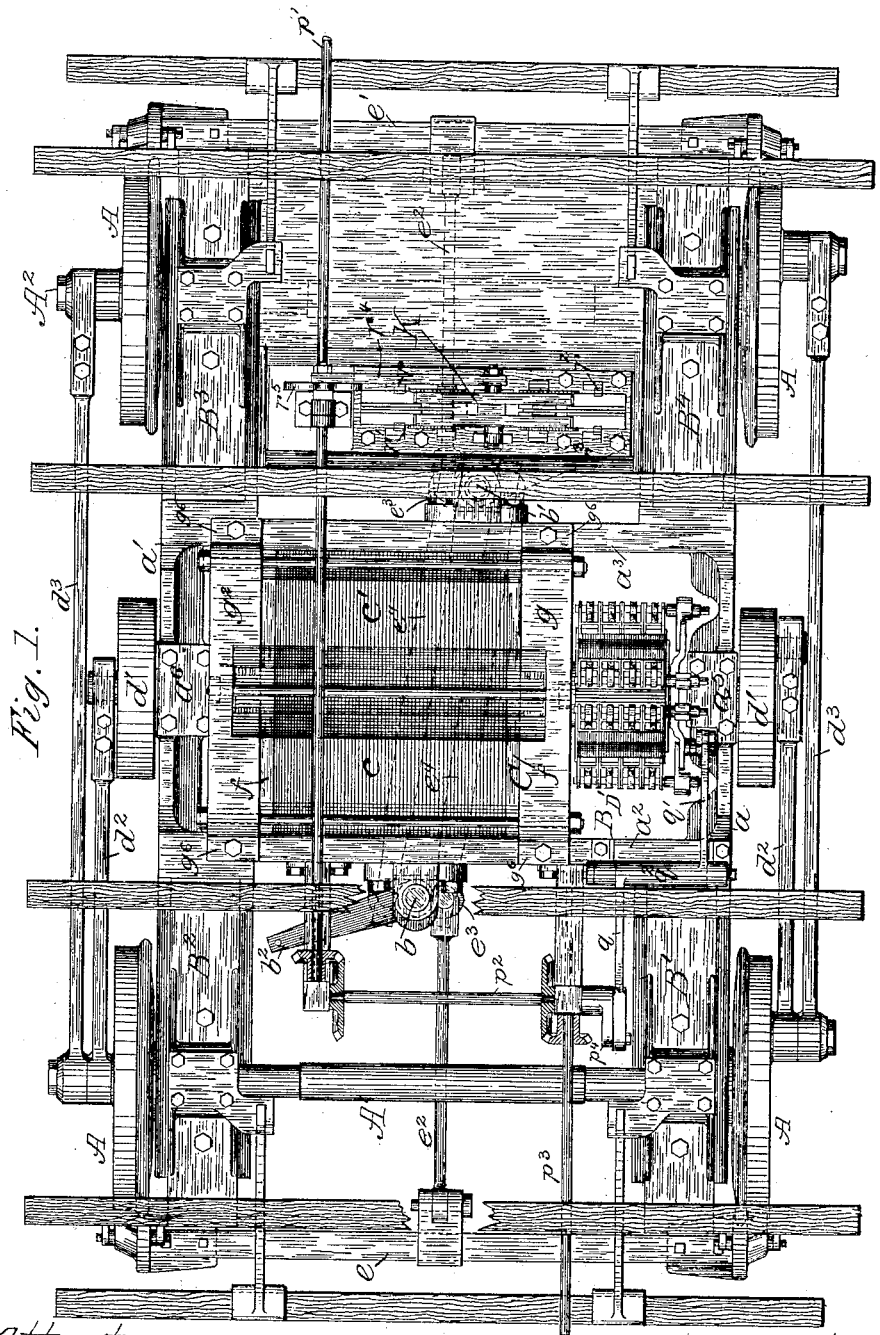

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.) 13 Sheets—Sheet 2.
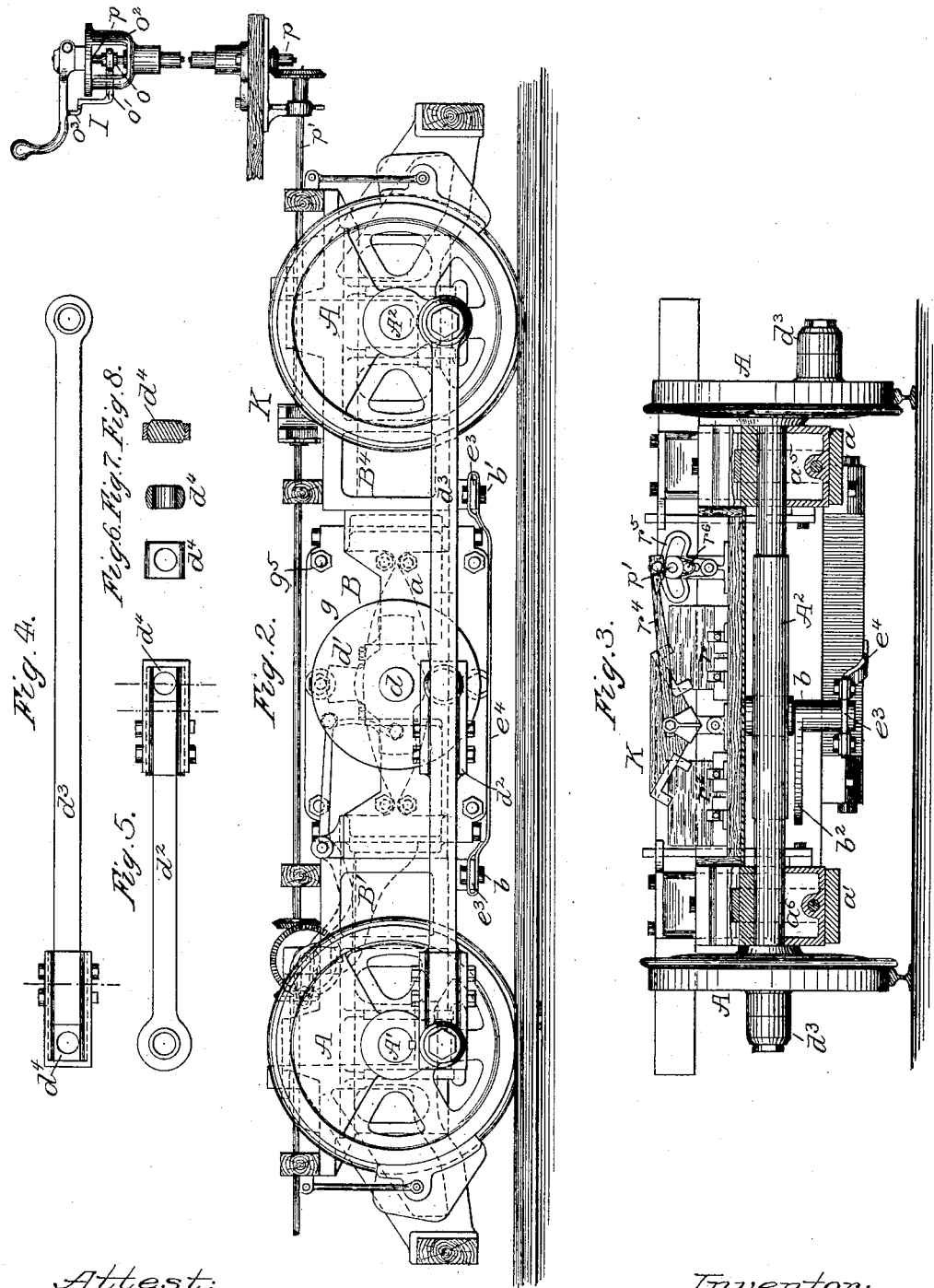

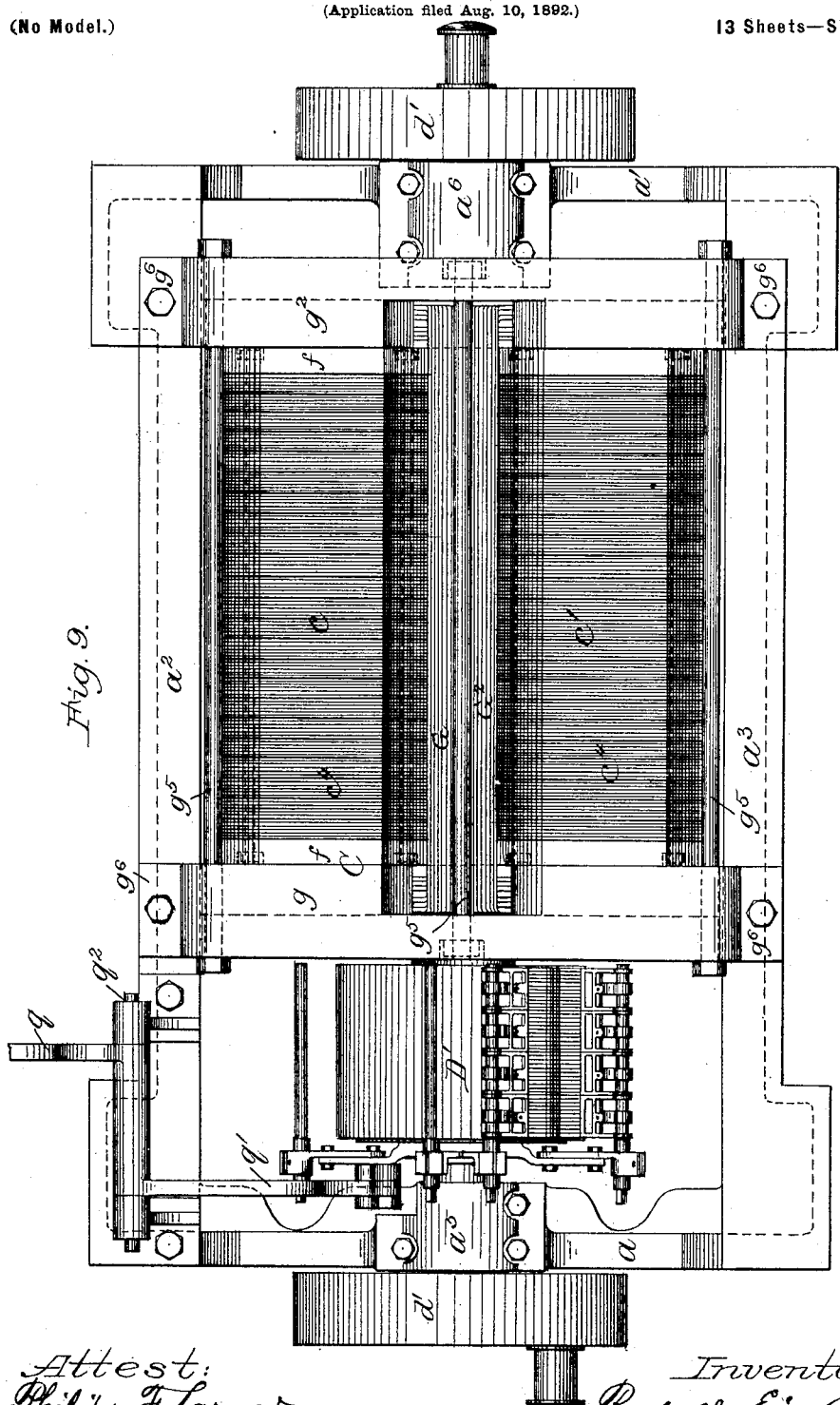

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.)
3 Sheets—Sheet 4.
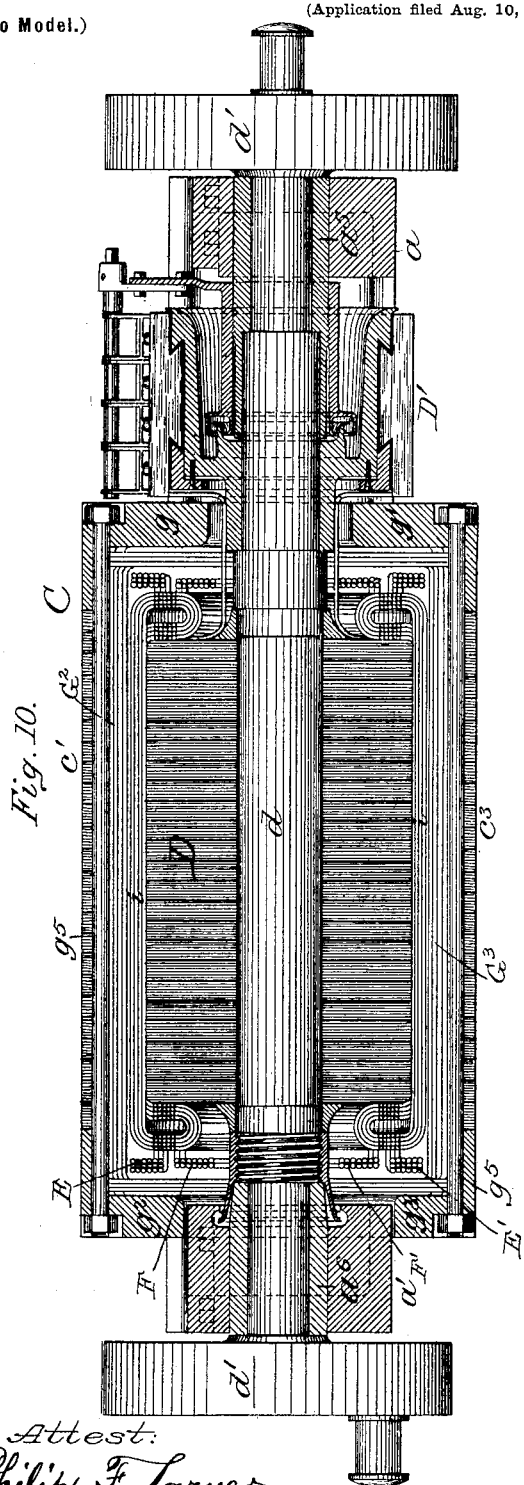
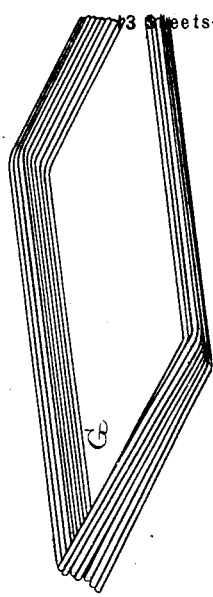
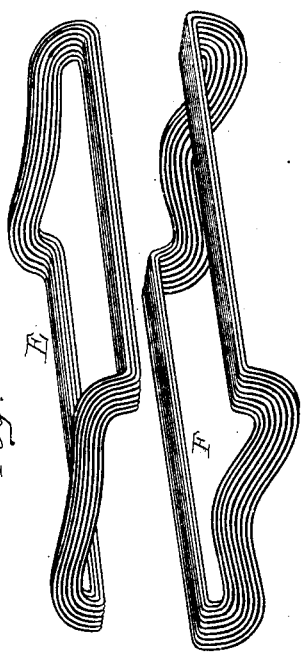
Attest:
Philip F. Larner
Howell Battle
Inventor:
Rudolf Eickemeyer
By
Attorney No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.) 13 Sheets—Sheet 5.
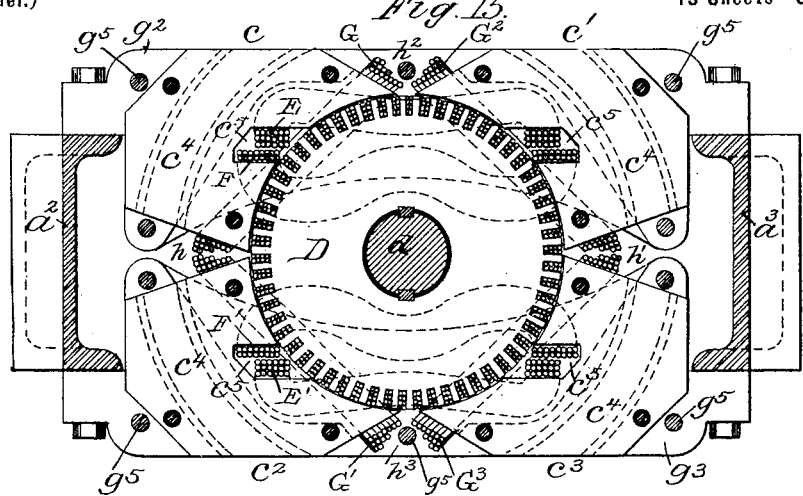
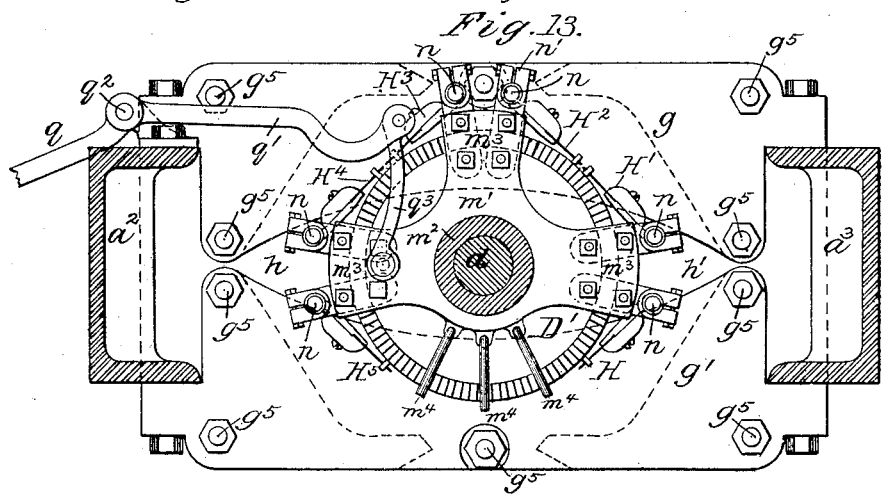
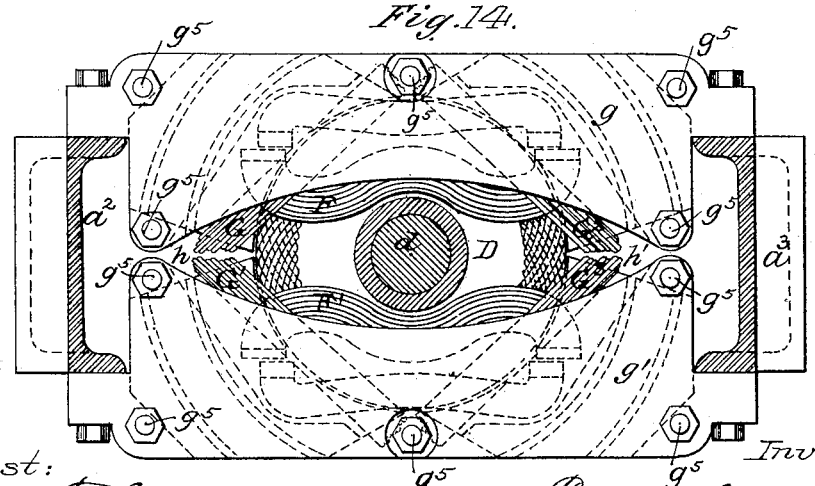

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.)
13 Sheets—Sheet 6.

Attest:
Philip F. Larner
Howell Bartle

Inventor:
Rudolf Eickemeyer
By M. C. Mud
Attorney

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.) 13 Sheets—Sheet 7.

Attest:
Philip F. Larner
Howell Bartle

Inventor:
Rudolf Eickemeyer
By _____
Attorney

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.) 13 Sheets—Sheet 8.
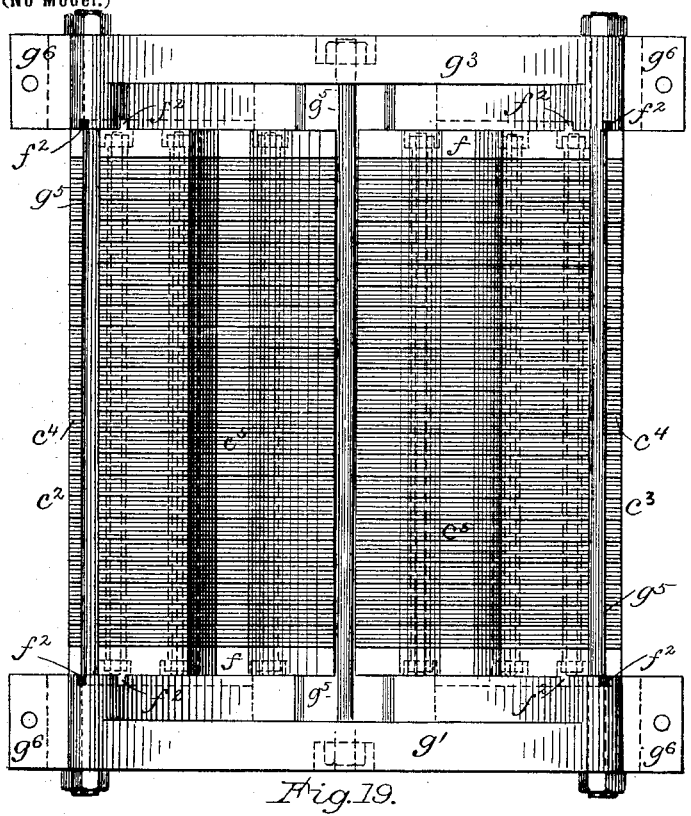
Fig. 19.
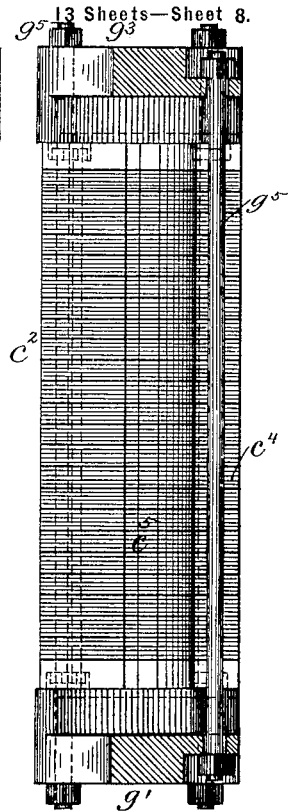
Fig. 20.
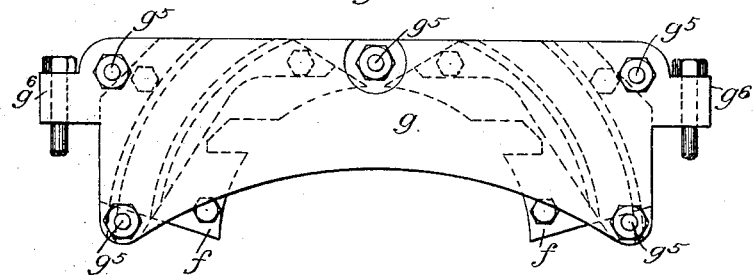
Fig. 21.
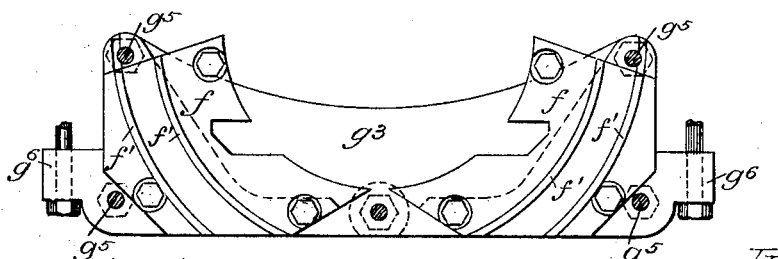
Attest: Philip F. Larner, Howell Zartte
Inventor: Rudolf Eickemeyer By M.C. Mix Attorney No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.)
13 Sheets—Sheet 9.
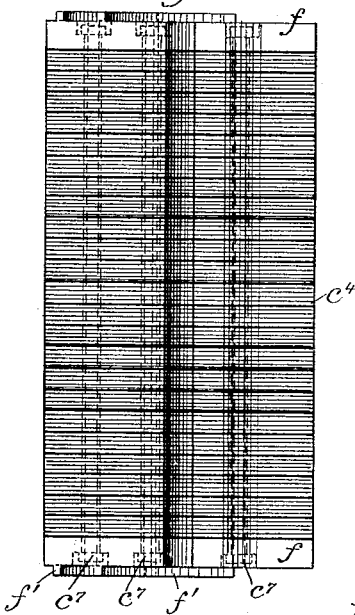
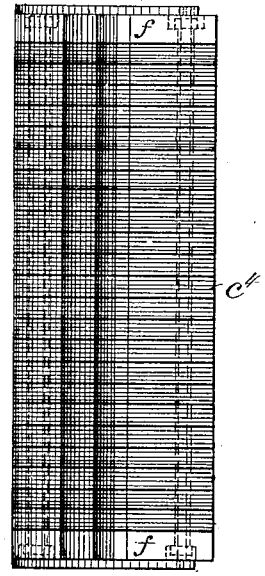
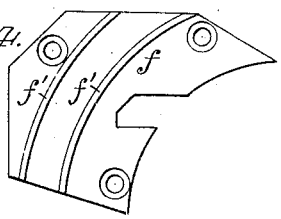
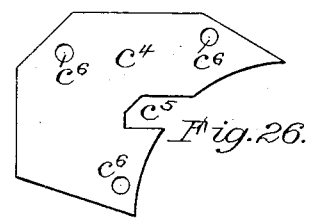
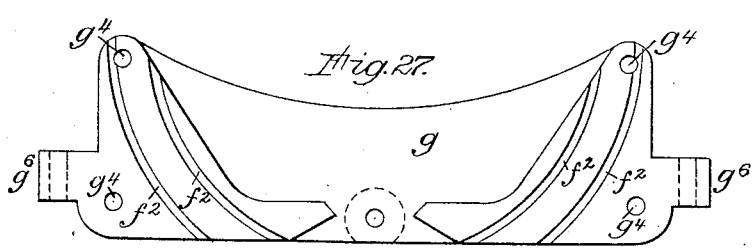
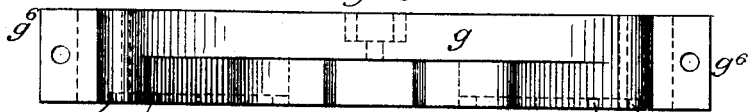
Attest:
Philip F. Larner
Howell Barth
Inventor:
Rudolf Eickemeyer
By ___ Attorney

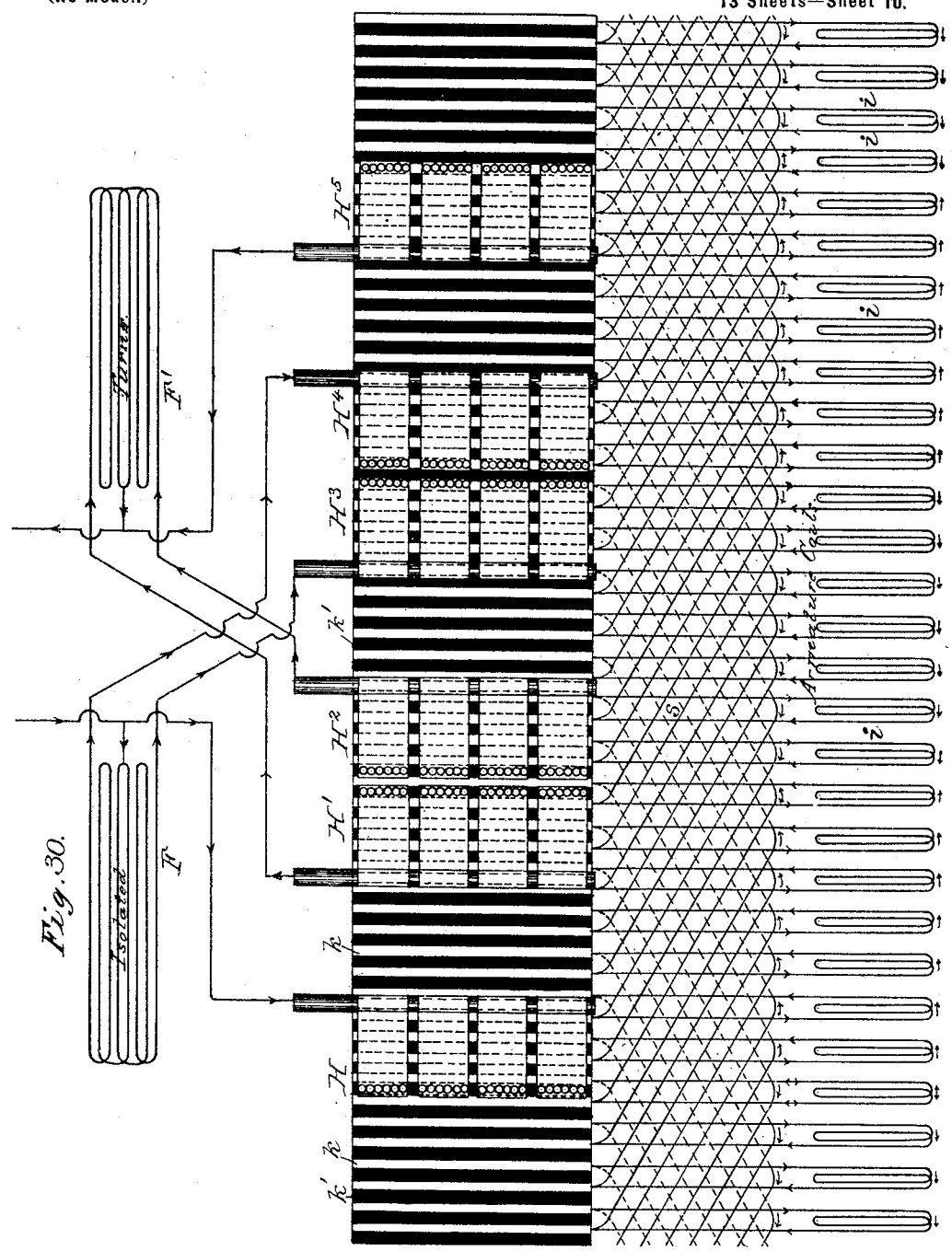

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.) 13 Sheets—Sheet 11.
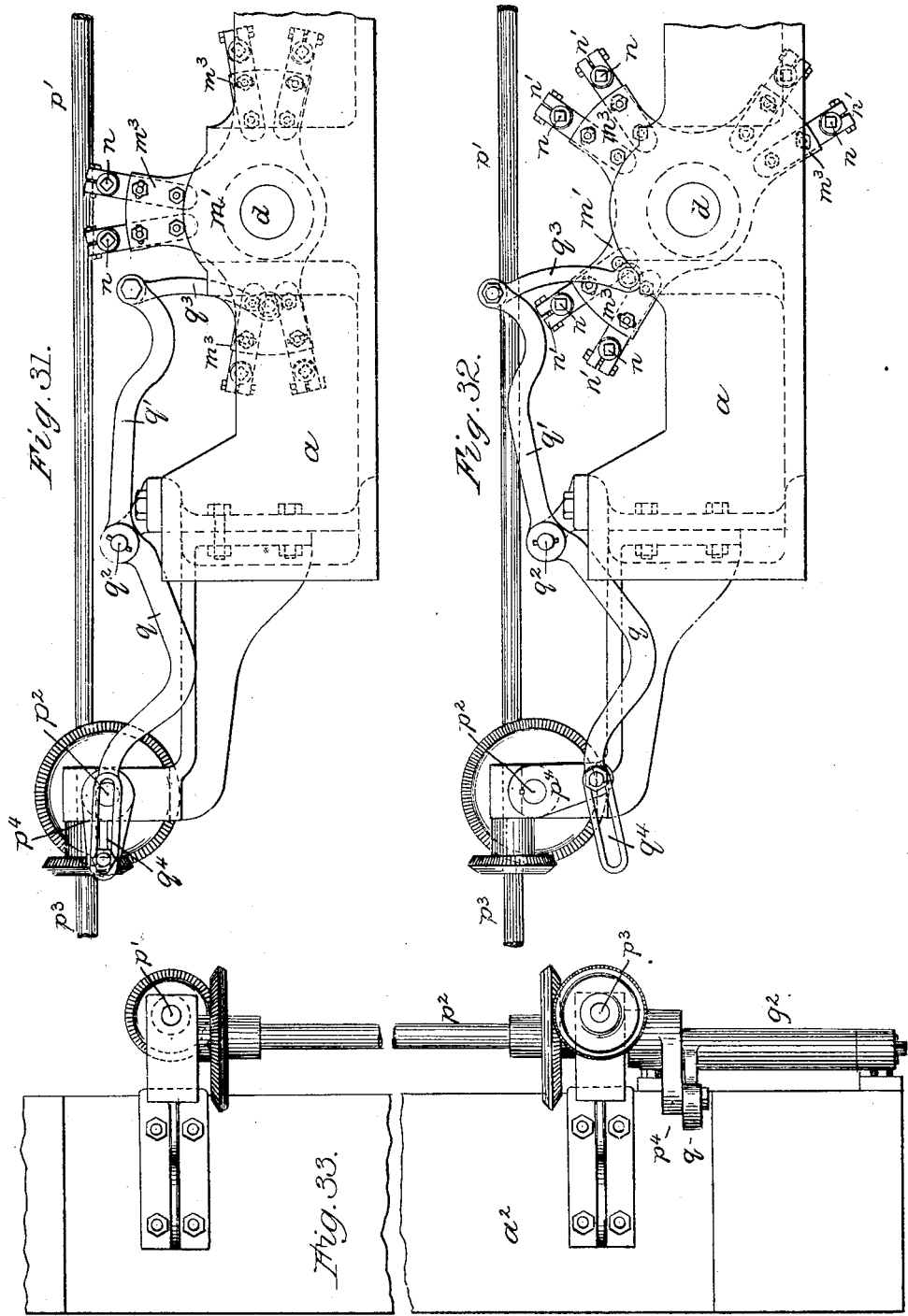

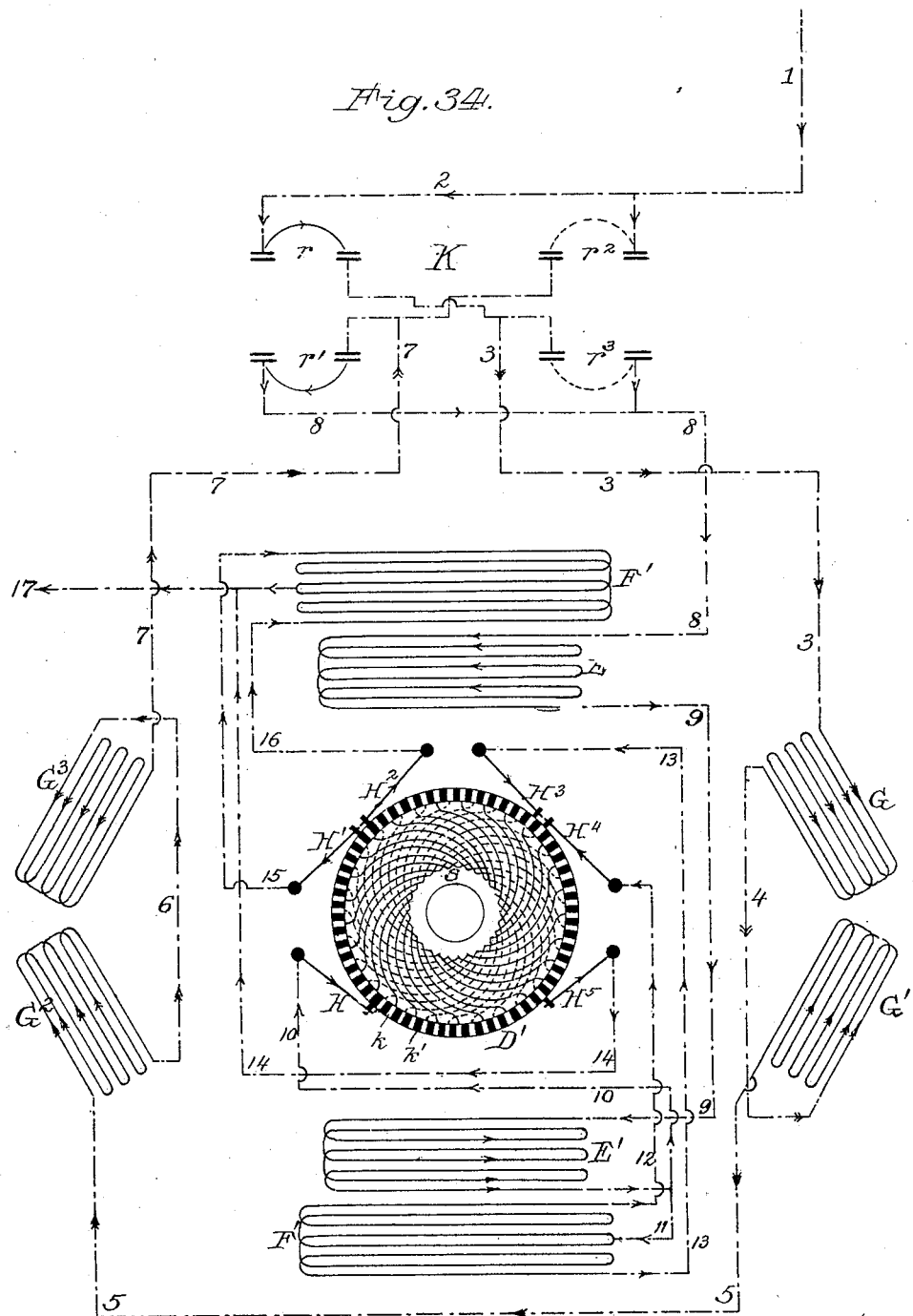

No. 700,310. Patented May 20, 1902.
RUDOLF EICKEMEYER, Dec'd.
RUDOLF EICKEMEYER, Jr., CARL EICKEMEYER & MARY T. EICKEMEYER, Executors.
ALTERNATING CURRENT ELECTRIC MOTOR AND CONTROLLING MEANS THEREFOR.
(Application filed Aug. 10, 1892.)
(No Model.) 13 Sheets—Sheet 13.

Attest:
Philip F. Larned
Howell Bartle

Inventor:
Rudolf Eickemeyer
By Wm C Mrd
Attorney

UNITED STATES PATENT OFFICE.

RUDOLF EICKEMEYER, OF YONKERS, NEW YORK; RUDOLF EICKEMEYER, JR., CARL EICKEMEYER, AND MARY T. EICKEMEYER EXECUTORS OF SAID RUDOLF EICKEMEYER, DECEASED.

ALTERNATING-CURRENT ELECTRIC MOTOR AND CONTROLLING MEANS THEREFOR.

SPECIFICATION forming part of Letters Patent No. 700,310, dated May 20, 1902.

Application filed August 10, 1892. Serial No. 442,722. (No model.)

*To all whom it may concern:*

Be it known that I, RUDOLF EICKEMEYER, of Yonkers, in the county of Westchester and State of New York, have invented certain new and useful Improvements in Alternating-Current Electric Motors and Controlling Means Therefor; and I do hereby declare that the following specification, taken in connection with the drawings furnished and forming a part thereof, is a clear, true, and complete description of my invention.

The motor disclosed herein is an improved form of a novel type of alternating-current motor heretofore patented to me in Letters Patent No. 567,119, granted September 1, 1896, and is especially devised and constructed for service in electric locomotive organization; but it is to be understood that I do not consider my invention to be limited to this particular application.

After describing my invention as embodied in the machines illustrated in the drawings such features of my invention as are deemed appropriate to this application will be duly specified in the several clauses of claim hereinafter annexed.

Figure 17:
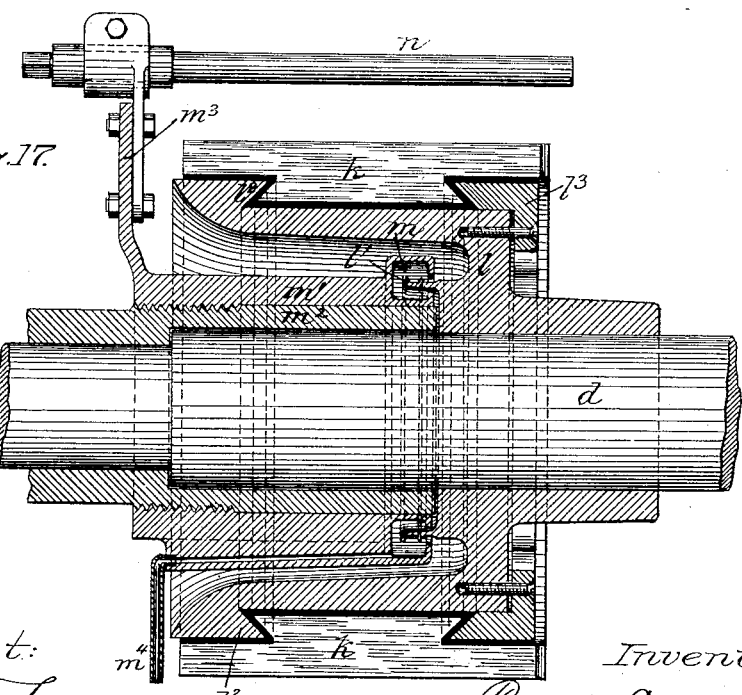
Figure 18:
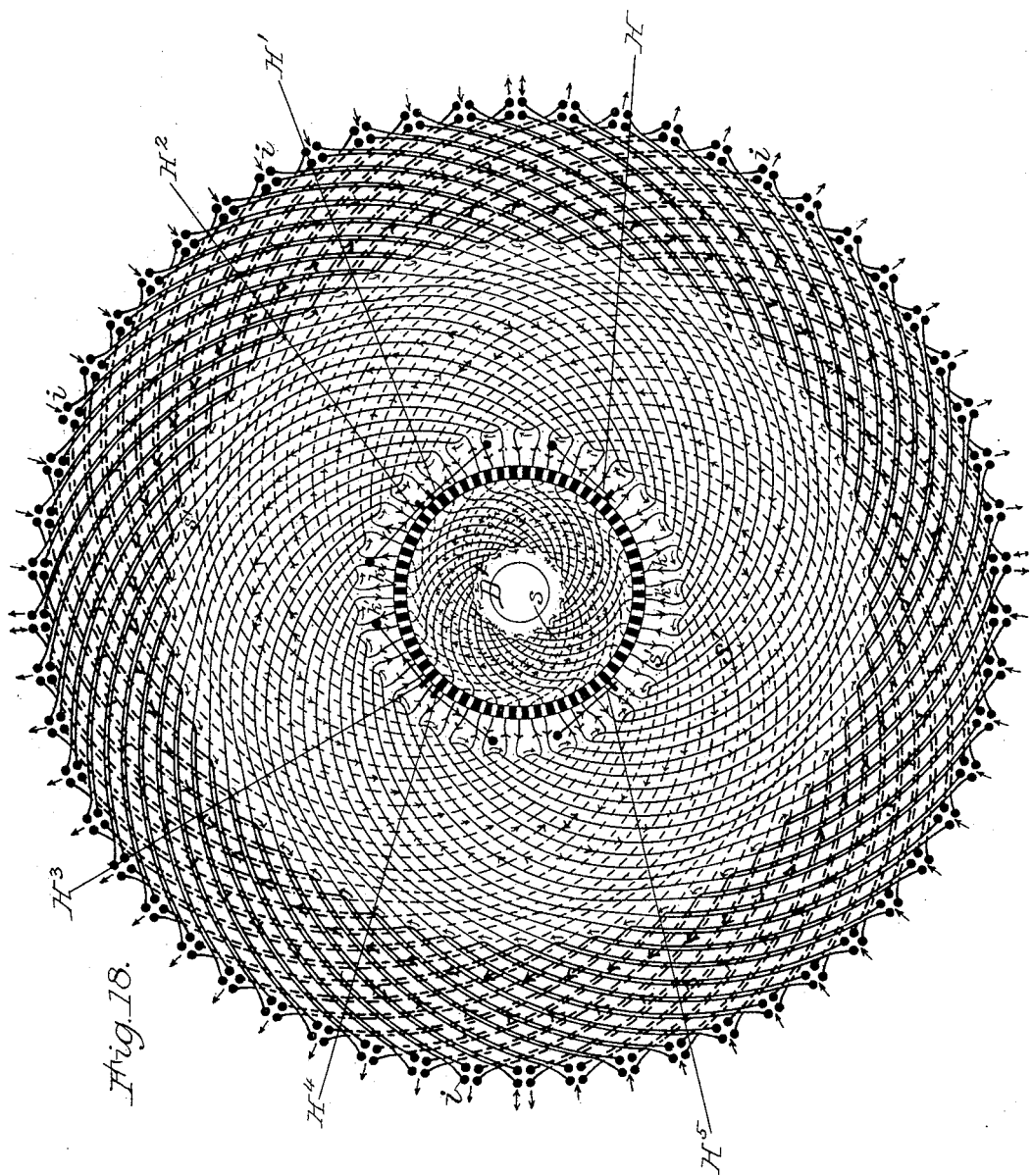
Figure 35:
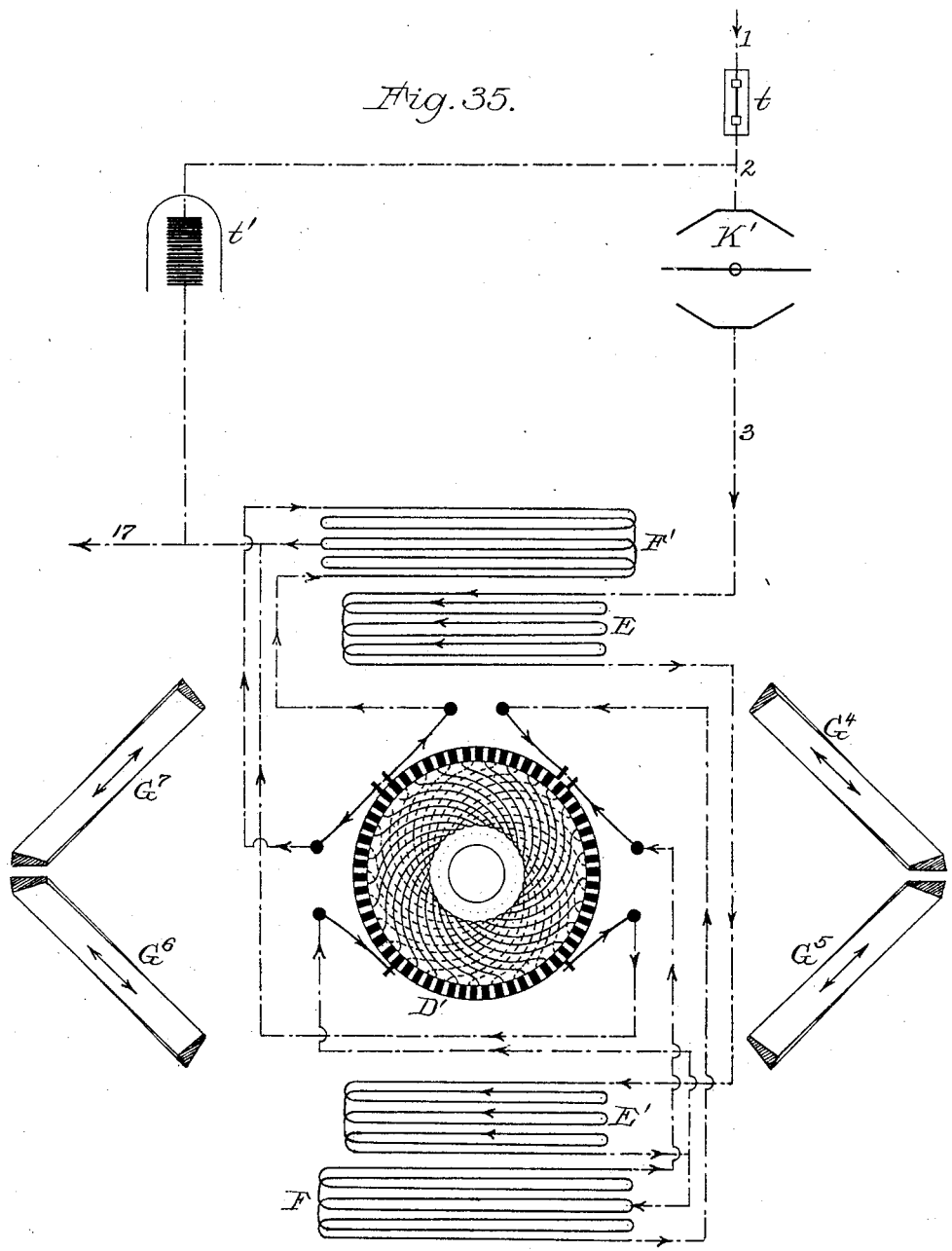

Referring to the drawings, Figure 1, Sheet 1, is a plan or top view of a locomotive-truck with the motor mounted thereon and having its controlling mechanisms all in accordance with my invention, some of the parts being shown in section and others broken away for the better illustration of underlying parts. Fig. 2 illustrates said truck in side elevation. Fig. 3 is a lateral vertical section of the truck on a line adjacent to one of the axles. Figs. 4 and 5, in side views, respectively illustrate one of the shackle-bars or connecting-rods and one of the pitmen by which the motor-shaft is coupled to the axle-wheels. Figs. 6, 7, and 8, in sectional views, illustrate the wrist-pin boxes of the pitmen and the connecting-rods. Fig. 9 is a plan view of the motor and adjacent side portions of the truck-frame on a scale larger than in Fig. 1, portions of the commutator-brushes being removed. Fig. 10 is a vertical section of the motor and frame on a line longitudinal with the armature-shaft. Fig. 11, in perspective, illustrates the two forms of field-coils employed, the upper one in the figure being termed by me a "field-coil" and the other an "isolated" or "counterbalancing" field-coil. Fig. 12 is a perspective view of certain counter field-coils in one of the forms thereof employed by me. Fig. 13 is an end view of the motor, showing its commutator and its brushes, lateral portions of the truck-frame being shown in section. Fig. 14 illustrates the end of the motor opposite from the commutator. Fig. 15 is a lateral vertical sectional view through the middle of the motor. Fig. 16 illustrates the commutator and its brushes, partially in an inner end view and partly in section, without its crosswise connections. Fig. 17 illustrates the commutator in section and the rotative foundation for the brushes. Fig. 18 illustrates the armature-winding, its commutator connections, and the arrangement of its brushes. Fig. 19 illustrates one half of the field metal of the multipolar magnet of the motor detached from the machine, the view being applicable to the inner or under side of the top or to the inner or upper side of the bottom of either half of the field-magnet, each half containing the iron for two of the magnets, with the several necessary clamping-plates and rods or bolts. Fig. 20 is a central sectional view of the part shown in Fig. 19, this being the interior or face side of the cheek-pieces of one of the magnets. Fig. 21 illustrates the same in two views, the upper portion of said figures being an end view of the upper half of the field metal and the lower portion of said figure the lower half, with one of the outer or main clamping-plates removed. Figs. 22 and 23 respectively illustrate the cheek-pieces of one of the magnets and the inner clamping-plates in top or bottom and inside face views. Figs. 24 and 25, in side and edge views, illustrate one of the two inside clamping-plates at the ends of the magnets. Fig. 26, in side view, illustrates one of the numerous soft-iron sections of which the cheek-pieces are composed. Fig. 27 is an inside view of one of the outside clamping-plates. Fig. 28 is a central cross-section of one of said outside clamping-plates. Fig. 29 is a top view of the clamping-plate Figs. 27 and 28. Fig. 30 illustrates the commutator-hub in plane development, with the several brushes in position thereon, and in diagram illustrates the armature-windings and certain isolated "field-turns" or counterbalance field-coils employed in the motor. Figs. 31, 32, and 33 illustrate brush shifting or controlling mechanism, the brushes being shown in Fig. 31 as when at rest and in Fig. 32 as when in position for forward operation of the locomotive. Fig. 34 is a diagrammatic illustration of the several electric circuits of the motor. Fig. 35 illustrates a modification of the arrangement of said circuits, with solid or closed circuit counter-fields.

The construction of the truck-frame and the method of mounting the electric motor thereon and the spring-mounting of the truck-frame on the wheel-axles are illustrated in Figs. 1, 2, and 3, it being understood that this portion of the organization embodies many improvements heretofore patented to me. (See Letters Patent No. 443,671, December 30, 1890, and No. 453,167, May 26, 1891.) The car-wheels A, serving in this instance as crank (or driving) wheels, render it necessary that the truck-frame should rest on the two wheel-axles $A'$ $A^2$ between the wheels. As heretofore disclosed by me in my application filed April 8, 1891, Serial No. 388,070, the truck-frame is a complete metallic structure consisting of a central section B and four longitudinal extensions $B'$ $B^2$ $B^3$ $B^4$, each of the latter having axle-box jaws, as indicated. The ends $a$ and $a'$ of the central section, with these axle-jaw extensions, constitute the side plates of the truck-frame, these side plates considered as a whole being rigidly connected laterally by cross-bars $a^2$ $a^3$. In its best form this central section is an integral structure, the two end pieces $a$ $a'$ serving as supports for the bearings or boxes $a^5$ $a^6$ of the motor armature-shaft, and the two cross-bars $a^2$ $a^3$ serving as the immediate supports for the electric multipolar magnet of the motor C, said magnet being capable of application to and removal from the truck-frame without in any manner disturbing the armature D, the latter being also capable of removal vertically after detaching the covers of the boxes $a^5$ $a^6$ and the upper pair of electromagnets $c$ $c'$ and disconnecting the overlying portions of adjacent mechanism. The cross-bars $a^2$ $a^3$ also support bearings for two vertical rock-shafts $b$ $b'$ as portions of the braking mechanism. As in my prior patented machines, the two ends of the armature-shaft $d$ carry crank-disks $d'$, which are usually coupled to the wrist-pins of one pair of the car-wheels on the axle $A'$ by means of pitmen $d^2$, and these car-wheels are coupled to those on the axle $A^2$ by coupling-links $d^3$, these and the pitmen being provided with semiglobular wrist-pin boxes $d^4$, which, as illustrated in Figs. 4 to 8, inclusive, are adapted to swivel with relation to the pitmen and connecting-links, so that during the independent tilting movements of the axles there will be no binding action at the wrist-pins.

The braking mechanism, as shown in Figs. 1, 2, and 3, is unlike that heretofore devised and disclosed by me. The pendent brake-beams $e$ $e'$ are connected by links $e^2$ with short horizontal levers $e^3$ $e^3$, which are respectively carried on the vertical rock-shafts $b$ and $b'$, before mentioned, and are connected together by bent links $e^4$ $e^4$, extending beneath the electric motor. Each vertical rock-shaft is provided with a laterally-extending arm $b^2$, with the outer ends of which brake chains or rods are connected for operation, as by the usual hand-brake winches at the one or the two ends of the car. These rock-shafts may be suspended from their bearings, or if in the form of sleeves they may be axially mounted upon pendent studs, care being taken in either case to secure the necessary strength and a minimum of lost motion, so that draft on either chain and the forward swinging of either of the levers $b^2$ will promptly actuate the brake-beams and set their shoes against the rims of the wheels.

The motor C embodies many novel features in construction, and I will first describe the multipolar field-magnet, within which the armature D is located. Considered as a complete structure this multipolar field-magnet includes portions of the cross-bars $a^2$ and $a^3$ of the iron or steel truck-frame; but said bars are in this organization only mechanical elements and do not constitute portions of the magnetic system, as in my continuous-current locomotives.

The multipolar field-magnet includes in this instance four distinct magnets so far as the iron cheek-pieces are concerned; but said magnets are coupled into upper and lower pairs, each pair having field-coils common to the two magnets, each of said pairs of magnets and their coils being massed together and constituting a complete detachable half of the multipolar field-magnet.

The cheek-pieces of all the magnets are counterparts, as at $c$, $c'$, $c^2$, and $c^3$, and a description of one of them will serve for all. Each cheek-piece is laminated, being composed of numerous counterpart soft-iron plates $c^4$, one of which is separately shown in Fig. 26, and although they have a peculiar outline they are substantially of the horseshoe form, the arms being separated by a recess, as at $c^5$, on each side of which the edges are concaved to conform to the periphery of the armature and afford separate cheek-pieces. These plates are provided with accurately-located bolt-holes, as at $c^6$, so that when the plates are properly insulated, as by interposed paper or sheets of vulcanized fiber, the whole may be clamped together by means of bolts $c^7$ within suitable insulating-tubes and a pair of inner clamping-plates $f$, preferably composed of non-magnetic metal. One of these clamping-plates $f$ is separately shown in Figs. 24 and 25, its contour conforming with the iron plates $c^4$, as well as its bolt-holes; but these are well countersunk at the outer side of the plate. The outer sides of these plates are provided with curved ribs $f'$, of which there are two in this instance, for the occupation of correspondingly-curved grooves $f^2$ in the inner sides of the outside clamping-plates $g$ $g'$ $g^2$ $g^3$, one of which is shown detached in Figs. 27, 28, and 29.

The magnetic metal of each magnet, with its inner clamping-plates, its bolts, and the insulating-sheets between the iron plates, constitutes a complete detachable iron section of the multipolar magnet, and it can occupy any one of the four positions with respect of the outside clamping-plates $g$, $g'$, $g^2$, and $g^3$, because said magnetic sections are counterparts and interchangeable. The outside clamping-plates $g$, $g'$, $g^2$, and $g^3$ may also be composed of non-magnetic metal, although this is not always essential because of the use of the non-magnetic inner clamping-plates. The outer clamping-plates are also counterparts and interchangeable as to either of the four positions, each having bolt-holes $g^4$ for receiving the main clamping-bolts $g^5$ and also having ears $g^6$ at the ends for enabling them to be supported by and bolted to the truck-frame, as clearly shown in Figs. 1, 9, and 13, the iron portion of a pair of magnets all complete being shown in Figs. 19 and 21. The construction and arrangement of these portions of the multipolar electromagnet as thus far described not only involve economy in the manufacture of the parts and their assemblage, but great convenience and facility in dismantling, as for repairs, is afforded.

It will be seen on reference to Fig. 15 that the several masses of magnetic metal are so shaped that when assembled they are separated by V-spaces $h$ $h'$ $h^2$ $h^3$, which are essential features in my alternating-current motor, as will be hereinafter explained. The recesses $c^5$ between the two cheeks of each magnet are occupied by the straight sides of field-coils E E', each one of said coils serving for two magnets, the ends of the coil being offset, curved, and in the form of a flattened arch, as illustrated in the upper coil of Fig. 11 and also in Fig. 14 in dotted lines. The sides of these field-coils E E', as shown in Fig. 15, only partially fill said recesses $c^5$, other portions thereof being similarly occupied by the straight sides of the other coils F F', which I will term "isolated" coils or "counterbalancing" field-coils, one of which is shown in Fig. 11 having its ends offset and doubly curved, as is clearly indicated in said figure, as well as in Fig. 14, and each of these coils also serves for two magnets, as is clearly indicated. These isolated or counterbalance field-coils F F' are of comparatively high resistance and are preferably composed of German silver or manganese copper wire, and they occupy field-space in the magnetic circuit closely adjacent to the field-coils E E', but without any direct electric connection therewith, and their function is to counterbalance the electromotive force induced in the armature coil or coils which are just passing under the brushes, said counterbalancing being accomplished by means of the electromotive force induced in these isolated field-coils, as was fully set forth in my Patent No. 567,119, granted September 1, 1896.

Each of the four magnets is longitudinally surrounded by a counter field-coil, as at G G' $G^2 G^3$, each being rectangular in form, as shown in Fig. 12, and so wound that the sides thereof are nearly triangular in cross-section, so that they may be located well within the V-spaces $h$ $h'$ $h^2$ $h^3$ and in quite close proximity to the periphery of the armature D, as clearly indicated in Figs. 14 and 15. These counter field-coils are of such length that their ends overlie the curved ends of the adjacent field-coils and the isolated field-coils, as clearly indicated in Fig. 10 and in dotted lines in Figs. 14 and 15. The ends of these several coils occupy spaces provided for their reception within recesses at the inner sides of the main or outside clamping-plates $g$ $g'$ $g^2$ $g^3$, as clearly indicated in Figs. 10 and 29. It will now be seen that each of the upper and lower halves of the multipolar electromagnet is a complete structure, embodying four separate coils and two masses of magnetic metal, each affording two cheeks. Constructed as described, the assemblage of these parts in each half of the magnet is readily accomplished and the two halves can be readily placed in position on the truck-frame or readily removed therefrom without the least disturbance of the armature D and without liability of injury thereto or to its commutator D'.

The armature D has a laminated core composed of numerous well-insulated disks of soft iron properly clamped upon the shaft $d$, and said core (as in Paccinnotti machines) is longitudinally grooved at its periphery for the reception of its double armature-coils $i$, as clearly indicated in Figs. 10, 15, and 18, and they are coupled together in division and to the bars of the commutator D' in a manner appropriate to a four-pole magnet, it being understood that although there are in this machine four magnets, each having two cheeks, the several cheeks are so excited that each two cheeks adjacent to the V-spaces $h$, $h'$, $h^2$, and $h^3$ are for the time being of corresponding polarity, or, in other words, each pair of said adjacent cheeks may be considered as one cheek-piece similarly magnetized as to polarity, but separated into two parts by the V-spaces.

The armature-winding is diagrammatically illustrated in Fig. 18, wherein the bars of the commutator D' are indicated with the six brushes which coöperate therewith, it being understood that the armature-coils are connected in series in a closed circuit and coupled only to bars $k$, which alternate with intervening bars $k'$, which have no connection with the armature-winding, and are therefore termed "dead" bars, this alternation of "live" bars and dead bars preventing the short-circuiting of the armature-circuits while the brushes are passing from one live bar to the next.

In Fig. 18 the armature-coils are multiple coils, and as shown have but two turns each; but it is to be understood that they may contain any desired number of turns. The two straight sides of each coil are separated from each other a little less than ninety degrees, or one-quarter of the circumference of the armature, thus securing symmetrical positions with reference to the magnetic field polarity. Each two diametrically opposite coils are joined in series by connecting-wires $s'$, (these being shown as single wires, while those in the coils are shown as doubled,) and therefore two oppositely-located symmetrical coils constitute in substance an integral coil, the two terminals of which are respectively connected with two adjacent live bars $k\ k$ of the commutator, while the terminals of the next integral coil instead of being connected with the next adjacent live bars are connected with those live bars $k\ k$ which are at the opposite side of the commutator. As the oppositely-located live bars are connected with each other by the wires $s$, the effect is the same as if the several consecutive live bars were consecutively connected with the armature-coils in their regular order; but by the arrangement shown the weight of the connecting-wires is well balanced all around the armature and ample space is afforded for the several commutator-brushes.

The electric current enters and leaves by way of the two sets of three brushes each, $H\ H^3\ H^4$ and $H'\ H^2\ H^5$, respectively, which bear upon adjacent live bars—as, for instance, if the brushes $H^3$ and $H^4$ bear, as shown in Fig. 18, upon two adjacent dead bars $k'$, then one connection is made by way of the brush $H$, which bears upon a diametrically opposite live bar $k$, which in substance is the live bar $k$ between said two dead bars, because of the interconnection by way of the appropriate connecting-wire $s$. Of the other set of brushes as here shown the other connection is made by way of the brushes $H'$ and $H^2$, which rest upon adjacent live bars $k$, while the brush $H^5$ bears upon a dead bar.

The construction of the commutator-hub $D'$, with the brushes and their carrier, is illustrated in detail in Figs. 16 and 17. The shell $l$ of the hub is firmly secured to the armature-shaft $d$, and it is hollow, bell-mouthed, and at the end of its interior it has a laterally-projecting lip $l'$, which occupies an annular chamber $m$ upon the inner end of the sleeved hub $m'$, which is freely rotative, although screw-threaded to a sleeve or bushing $m^2$ for the shaft $d$, said hub $m'$ serving as a foundation or carrier for the several brushes $H, H', H^2, H^3, H^4$, and $H^5$, each having its own lateral brush-arm $n$ and clamp $n'$, which is adjustably bolted to one of several arms $m^3$, radiating from the hub $m'$ at the end remote from the armature. This construction and combination of the lip $l'$, chamber $m$, and the brush-carrier precludes the possibility of defiling the commutator, as well as the armature-winding, with oil from the bearings of the armature-shaft, the brush-carrier being provided with a waste pipe or duct $m^4$, leading outward from the oil-catching chamber $m$, this being in accordance with a portion of my invention as heretofore patented, (Patent No. 454,336, June 16, 1891.) The periphery of the hub-shell $l$ is annularly rabbeted and provided with an undercut shoulder at $l^2$ for the reception of the several live and dead bars $k$ and $k'$, which are dovetailed at their inner edges, so that when properly seated and having proper insulating material interposed between them and between them and the shell $l$ they can all be securely clamped by means of a properly-shaped clamping-ring $l^3$ and suitable screws, as clearly shown in Fig. 16. The diametrically opposite live bars $k$ are connected with each other by involutely-curved wires, hereinbefore referred to, but not shown in these figures, it being understood that the ends of these conductors are soldered into notches provided therefor in the ends of the live bars, as shown in Figs. 16 and 17, the armature-coil terminals being in like manner connected to each bar.

Each of the brushes $H\ H'$, &c., is complex in its character, in that in this machine each embodies four leaves or springs, as clearly indicated in Fig. 30, (in plane development,) and each spring carries many carbon contacts in a row, and these are so duplicated in each leaf or spring that the contacts having been worn down upon one side the spring can be turned over for putting the opposite ends of the contacts into service, all involving features of invention heretofore patented to me. (Patent No. 397,492, February 12, 1889.) In this organization, however, the brush-carrier sleeve being screw-threaded upon the bushing-sleeve has a slight longitudinal movement during its rotation, and therefore the brushes are caused to vary their positions on the commutator, which is conducive to a uniform wear of the bars.

The mechanical organization by which the brushes are operated for starting, stopping, and reversing the motor is illustrated in Figs. 1, 2, 3, 31, 32, and 33.

An operating or controlling lever, crank, or hand-wheel is provided, as at I, Fig. 2. This hand-crank and its accompanying mechanism constitutes a unison-stop embodying features of my invention specifically claimed in my Patent No. 588,104, granted August 10, 1897. This hand-crank is applied to the upper end of a vertical shaft $p$, screw-threaded below the crank, and carrying a nut $o$, having an arm $o'$, laterally projecting through a vertical slot in a cup-shaped cap $o^2$ on the standard within which the shaft $p$ is located. The crank I has a pendent stud $o^3$, which normally—i. e., when the machine is at rest—abuts against the arm $o'$, and thus prevents rotation of the crank in one direction, but leaving it free to make its revolution in the opposite direction, as for driving the locomotive forwardly. The lever I is, however, pivotally coupled to the shaft $p$, so that it may be tilted and cause a disengagement of the stud $o^3$ and arm $o'$ for rotating the crank backwardly, as when the locomotive is to be run backwardly, from what may be at the time the front end of the car. The vertical shaft $p$ at its foot is geared, as shown in Fig. 2, to a horizontal shaft $p'$, extending rearwardly above the motor C and preferably constructed in sections detachably coupled. The rear end of said shaft $p'$ is geared to a short lateral counter-shaft $p^2$, which is in turn geared to a short shaft $p^3$, extending up to the adjacent end of the car, to serve, like the shaft $p'$, as a connection with another vertical shaft $p$ at that end of the car. At one end of the counter-shaft $p^2$ there is a crank $p^4$, which is coupled to a two-armed lever $q\ q'$ on a central rock-shaft at $q^2$, and the opposite end of said lever is coupled by a pendent link $q^3$ to the brush-carrier sleeve or hub $m'$. The crank-pin of the crank $p^4$ laterally occupies a slot at $q^4$ in the end of the lever $q$, so that the rotative movement of the crank will cause the lever to tilt or rock, and thus impart the requisite rotative movement to the brushes.

The main switch or cut-out is shown at K, Figs. 1, 2, and 3, and it is so coupled to the shaft $p'$ that it properly makes connections with respect of the several movements of the brushes. This cut-out is a tilting switch K, provided with movable and stationary contacts, as at $r\ r^3\ r'\ r^2$, and it is coupled by a link $r^4$ with a vertical cam-lever $r^5$, (shown in Fig. 3,) which is pivoted at its foot, is loop-shaped at its upper end, and surrounds the shaft $p'$, the bottom of the loop communicating with a slot the sides of which are engaged by a crank-pin having a roller and carried on a pendent arm $r^6$, which is carried by the shaft $p'$. The organization of this cut-out is such that when the switch-block is rocked to the one side or the other four movable contacts on the block engage with four coincident appropriate stationary contacts, as clearly illustrated in Fig. 34 at K $r\ r'\ r^2\ r^3$, according to whether the machine is to be driven forwardly or backwardly. The roller-pin on the arm $r^6$ after causing the cam-lever to swing to its fullest extent passes from the cam-slot into the loop-space of the lever, (during the further continued rotation of the shaft $p'$ in the same direction,) thus providing for the lost motion which enables the cut-out to be operated just before the commutator-brushes arrive at their position of rest, as for stopping the machine.

I will now describe the electrical connections and the mode of operation of the motor and the controlling means.

Referring to Figs. 18 and 30, it will be seen that the arrangement of the bars $k\ k'$ of the commutator $D'$ is clearly indicated, as well as the coupling of the live bars $k$ to each other, as by the wires $s$, and to the several armature-coils $i$, and in Fig. 30 a connection of the isolated turns or counterbalancing-coils F F' with the armature-brushes is also indicated.

In Fig. 34 the entire electric organization is diagrammatically disclosed. The current entering, say, at line-wire 1, the latter being provided with the usual lightning-arrester and fusible plugs, (not shown,) reaches the cut-out switch K, thence to contacts at $r$, to wire 3, through the counter field-coils G G' G² G³ and their connecting-wires 4, 5, and 6, and back over wire 7 to the switch-contacts $r'$, to wire 8, and so on. If the motor is to be operated in the opposite direction, the connections at contacts $r$ and $r'$ are broken and the connections at $r^2\ r^3$ established, so that the current will then pass through the counter field-coils G³, G², G', and G (in a direction opposite to that first described) over wire 3 and contacts $r^3$ and over wire 8 to the field-coil E, thence by wire 9 to field-coil E'. After leaving this latter coil, E', the current divides, the one portion going directly over wire 10 to armature-brush H and into the armature, so long as said brush rests upon a live bar $k$, the other portion passing over wire 11 to the isolated or counterbalancing-coil F', therein again dividing. One portion of the current passes through the upper half of said coil, passes by wire 12 to the brush H⁴, and the other portion through the lower half of said coil F, over wire 13 to the brush H³, and from both of these brushes H³ and H⁴ the current passes into the armature. Leaving the armature, the current passes by way of brush H⁵ and wire 14 directly to the terminal wire 17, (so long as said brush rests on a live bar $k$;) but when said brush H⁵ rests on a dead bar $k'$ the current divides, passing from brushes H' and H², over wires 15 and 16, through the upper and lower halves of the isolated or counterbalance coil F', and out at the middle thereof to the terminal wire 17. The oppositely-located commutator-bars $k$ being connected by the wires $s$, the brushes H, H⁴, and H³ bear on certain bars at the same time that the brushes H⁵, H', and H² appropriately bear upon other commutator-bars—as, for instance, with brushes H³ and H⁴ on live bars and brush H on a dead bar, then brushes H' and H² will bear on dead bars and brush H⁵ on a live bar.

When running with full power, the commutator-brushes connect with those armature-coils which are just passing from one magnetic field-pole to the next one, so that the armature has no reaction upon the field, and therefore when the brushes are in said position the self-induction of the motor is at its minimum, while the torque and current are at the maximum, the position of the brushes referred to, for driving the motor forwardly, being indicated in Fig. 32. By moving the brushes around the commutator more and more of the armature-coils are caused to act magnetically in the field-magnet circuits, which increases self-induction in both the field and the armature, with a consequent decrease in current and torque, until when the brushes occupy the midway position of rest, as shown in Fig. 31, the whole armature is magnetically in series with the magnetic field-circuit, and the self-induction of the motor is at a maximum, the current flows but slightly, and no torque is exerted, the cut-out switch K breaking the circuit entirely when the brushes occupy the said position of rest. A further movement of the brushes causes the cut-out to close the circuit again, self-induction decreases, and the current entering the armature now in the opposite direction affords a reversal in the action of the motor, because the brushes by their motion have exchanged positions on the commutator, full power and speed being attained when the brushes stand at forty-five degrees from the position of rest—*i. e.*, have exchanged their position from the position appropriate to forward motion. The reversal of current is extended to the counter field-coils F F' when the armature-current is reversed by the exchange of armature-brushes caused by their rotative movement, because said coils form bifilar or non-inductive circuits with the armature, and to secure this the current in said coils must always flow opposite in direction to that of the current in the adjacent armature-coils.

The advantages accruing by the use of a machine of this type, aside from the fact that circuits of any reasonable length can be supplied with current from a single power-station, are in part as follows: No outside resistance is necessary, and the speed of the motor is regulated without loss of energy by an increase or decrease of self-induction in the motor. The current is kept within safe limits, and even when reversed while the motor is at full speed less than double the normal quantity of amperes will for an instant flow through the motor. A motor thus constructed will therefore work with almost equal efficiency at any desired speed, whereas with any of the continuous-current motors known to me their maximum efficiency is attained at a predetermined fixed speed, this being usually the highest speed for which the motors have been designed in each instance. Said speed capacity is seldom available in the ordinary operation of street-railway motors, and it is obvious that abnormal speeds result in a continuous loss in energy, causing undue heating of the motor-coils and a gradual disintegration of the insulating media employed.

My alternating-current motor has also the advantage that even while at rest and under a full application of the electric current the latter in the coils will never increase beyond a certain safe limit, the ordinary drag of self-induction in the machine preventing an abnormal flow, the amount or degree of this self-induction being so proportioned to the low number of current reversals employed (say from ten to fifteen per second) as to present no perceptible derangement to the ordinary operation of the machine.

In Fig. 35 I have illustrated another arrangement of the motor-circuits, which is especially adapted to street-car motors because it admits of the use of simpler switching mechanism. The cut-out switch K' is of the ordinary form; but the field-coils E E', counterbalance-coils F F', and the armature, with its brushes, are as before described, and the line-wire is provided with the usual fusible plug $t$ and lightning-arrester $t'$. The flow of magnetism in the magnetic circuit of the armature, as hereinbefore indicated, is neutralized by the use of counter field-coils which closely surround the armature-coils and are traversed by a current always opposite in direction to that flowing in the armature, thereby securing a bifilar or inductionless circuit. Instead of said coils being in circuit and having the current reversed therein at each reversal of current in the armature the counter-fields may be short-circuited upon themselves without any connection with the main circuit, in which case, as shown in Fig. 35, the counter-fields $G^4$ $G^5$ $G^6$ $G^7$ may be either wire coils or copper rings of large cross-section and preferably V-shaped in section for properly occupying the V-spaces or air-gaps $h$ $h'$ $h^2$ $h^3$ between the field magnetic circuits and enabling them to perform the duty of the counter field-coils G, G', $G^2$, and $G^3$ of Fig. 15. It will now be understood that the armature magnetism completes its circuit through or across said air-gaps and around the counter-fields, thus inducing in the latter an electromotive force which will produce an electric current of just sufficient strength to practically destroy the armature magnetism, the trace remaining being quite enough to induce a current in the counter-field ring or rings. This counter-field current lags ninety degrees behind the magnetism. The magnetism due to the combined action of the magnetizing force of the armature and counter-field reaches its maximum about midway between the maximum of armature-current and counter-field current, and therefore the magnetization lags about ninety degrees behind the armature-current, causing the counter-field current to lag behind the armature-current about one hundred and eighty degrees—*i. e.*, in opposite direction—and the direction of the counter-field current being opposite to that of the armature-current produces the bifilar or inductionless magnetic circuit with the armature-current.

In Fig. 35 the current enters at wire 1 over the safety-fuse $t$, through wire 2, in a branch of which a lightning-arrester $t'$ is located. After passing the cut-out switch $K'$ the current passes over wire 3 to and through the main field-coils E E' and through the isolated or counterbalancing coils F F', as before described in connection with Fig. 34, and passes from the armature to the ground or terminal wire 17, the counter-fields $G^4 G^5 G^6 G^7$ being out of the main circuit, as already described.

Having thus described my invention, I claim as new and desire to secure by Letters Patent—

1. In an alternating-current motor, provided with multipolar magnetic field-circuits; an armature provided with coils connected in series in a closed circuit, and occupying recesses in the periphery of the armature-core; counterbalancing field-coils of high resistance within the influence of the magnetic field-circuits, and counter field-coils comprising short-circuited windings surrounding the said field-circuits, closely adjacent to and overlying portions of the armature-coils.

2. The combination with an alternating-current motor provided with a suitable commutator and appropriate brushes rotatively mounted on the armature-shaft, of a circuit-breaker and controlling mechanism for said brushes and circuit-breaker, accessible to the operator, the motor organization being such that when the motor is at full speed, the operator by rotatively moving the brushes toward their inoperative position will deprive the motor of its driving power by increasing the self-induction of the motor, the circuit-breaker operating for cutting off the current from the motor when said self-induction reaches its maximum.

3. The combination with an alternating-current motor, provided with rotatively-mounted brushes, adapted by variations in position to start, stop, and reverse the motor, of a circuit-breaker, a set of counter field-coils interposed between similarly-magnetized cheeks and located closely adjacent to the armature, and controlling mechanism accessible to the operator for rotatively varying the position of the brushes, as for stopping and reversing, and also for reversing the current in the counter field-coils by variation in the position of the circuit-breaker.

4. In an alternating-current electric motor, the combination of a motor-armature, and a multipolar electromagnet embodying a series of iron cheeks in several pairs, each pair of which is embraced by a short-circuited coil.

5. In an alternating-current electric motor, the combination with a suitable armature, of a multipolar field-magnet, constructed in separable sections, each containing different magnets which are provided with counter field-coils for preventing self-induction of the armature.

6. In an alternating-current electric motor, the combination with a suitable armature, of a multipolar electromagnet embodying separated masses of insulated laminated iron, each mass concaved, longitudinally recessed, and parallel with the others, and separate rectangular field-coils, each of which at its sides occupies recesses in two separated adjacent masses of field-iron, and serves as the exciting medium for two separated magnets.

7. In combination, an alternating-current motor having an armature provided with a commutator, a tilting cut-out or switch for said motor, a controlling-shaft accessible to the operator, commutator-brushes rotatively operated for starting, stopping, and reversing; the cut-out or switch, intermediate shafting and gearing rotatively coupling the controlling-shaft to the brushes, and a cam-lever coupled to the tilting cut-out, and caused by said shafting to vibrate with appropriate lost motion, as between the rotation of the controlling-shaft and the operation of the cut-out.

RUDOLF EICKEMEYER.

Witnesses:
W. H. WILLS,
JOHN L. CLARK.